US012515504B2

(12) United States Patent
Tam

(10) Patent No.: US 12,515,504 B2
(45) Date of Patent: Jan. 6, 2026

(54) POWER RETRACTABLE TONNEAU COVER

(71) Applicant: Shun Kit Tam, Pico Rivera, CA (US)

(72) Inventor: Shun Kit Tam, Pico Rivera, CA (US)

(*) Notice: Subject to any disclaimer, the term of this patent is extended or adjusted under 35 U.S.C. 154(b) by 415 days.

(21) Appl. No.: 18/116,095

(22) Filed: Mar. 1, 2023

(65) Prior Publication Data
US 2024/0294056 A1 Sep. 5, 2024

(51) Int. Cl.
B60J 7/057 (2006.01)
B60J 7/04 (2006.01)
E05F 15/662 (2015.01)
F16D 11/14 (2006.01)

(52) U.S. Cl.
CPC ............. *B60J 7/0573* (2013.01); *B60J 7/041* (2013.01); *E05F 15/662* (2015.01); *E05Y 2201/216* (2013.01); *E05Y 2201/244* (2013.01); *E05Y 2201/434* (2013.01); *E05Y 2201/474* (2013.01); *E05Y 2201/684* (2013.01); *E05Y 2400/3013* (2024.05); *E05Y 2900/53* (2013.01); *F16D 11/14* (2013.01)

(58) Field of Classification Search
CPC ... B60J 7/053; B60J 7/068; B60J 7/057; B60J 7/041; F16D 11/14
See application file for complete search history.

(56) References Cited

U.S. PATENT DOCUMENTS

| 4,795,206 | A | * | 1/1989 | Adams | B60J 5/14 |
| | | | | | 296/100.09 |
| 5,040,843 | A | * | 8/1991 | Russell | E06B 9/581 |
| | | | | | 296/100.09 |
| 11,007,855 | B2 | * | 5/2021 | Rawnsley | B60J 7/067 |
| 11,142,050 | B2 | * | 10/2021 | Pompili | B60J 7/198 |
| 11,142,056 | B2 | * | 10/2021 | Miaoyi | B60J 11/025 |
| 11,376,934 | B2 | * | 7/2022 | Voetmann | B60J 7/041 |
| 11,884,145 | B2 | * | 1/2024 | Pompili | B60R 5/048 |
| 12,281,675 | B2 | * | 4/2025 | Kobayashi | F16D 43/2024 |
| 2022/0134851 | A1 | * | 5/2022 | Lin | E05F 15/603 |
| | | | | | 160/271 |
| 2024/0294056 | A1 | * | 9/2024 | Tam | F16D 11/14 |

FOREIGN PATENT DOCUMENTS

WO WO-2021026603 A1 * 2/2021 ............. B60J 7/068

* cited by examiner

*Primary Examiner* — Jason S Morrow
(74) *Attorney, Agent, or Firm* — AGK Patent & Trademark Law; Philip Y Kim

(57) ABSTRACT

A powered truck bed tonneau cover includes a handle operating a clutch to engage and disengage an electric motor from the tonneau cover. The handle is operable whenever the tonneau cover is open. A Hall sensor measures the position of the cover and a user may select closed and open positions for powered operation. A drive assembly of the powered truck bed tonneau cover resides just behind the cab and urges the cover into a spiral to avoid binding.

11 Claims, 7 Drawing Sheets

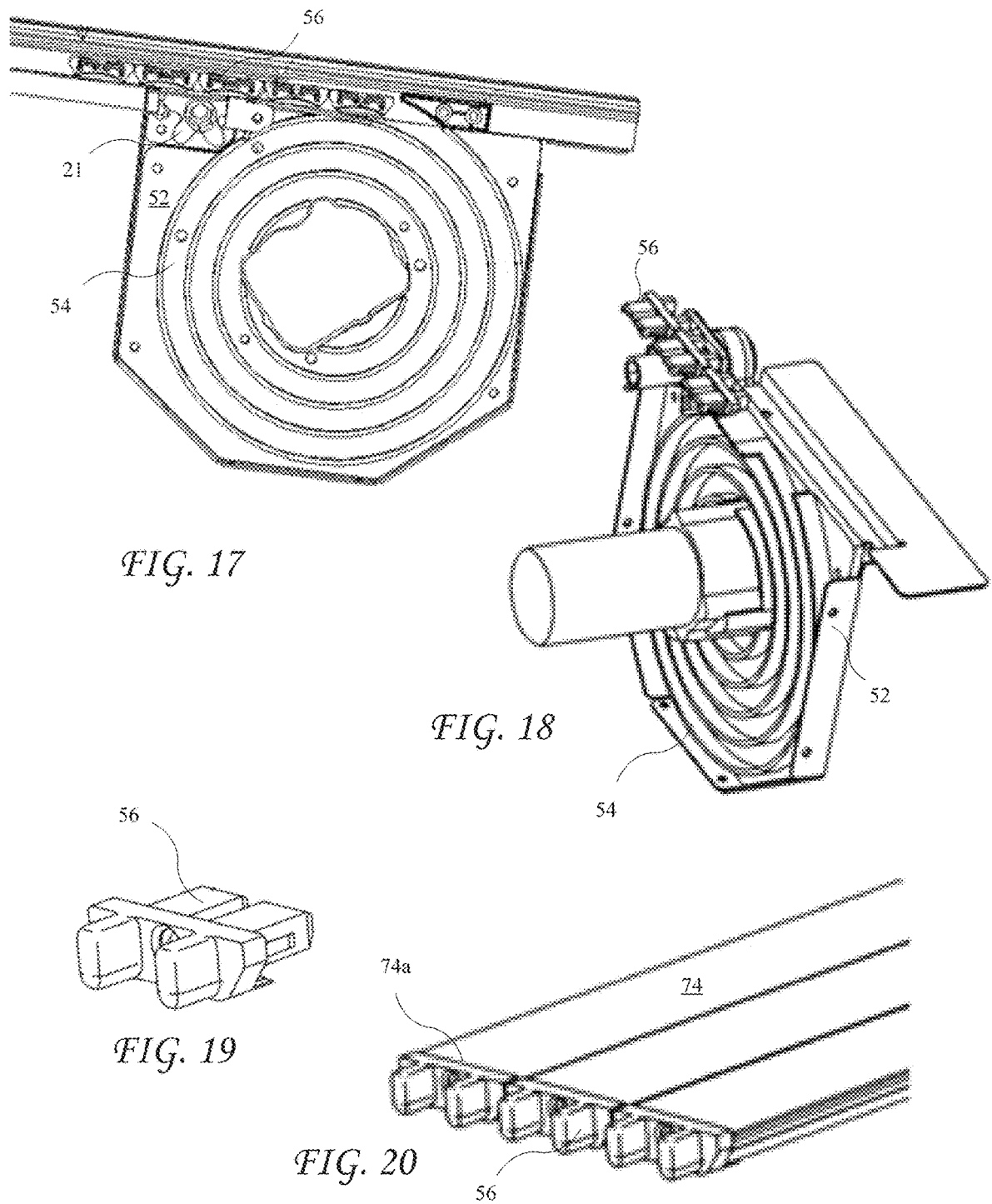

POWER RETRACTABLE TONNEAU COVER

BACKGROUND OF THE INVENTION

The present invention relates to truck bed tonneau covers and in particular to a power retractable truck bed tonneau cover.

Truck bed tonneau covers are available but are generally only manually operable. Some known powered truck bed tonneau covers are available, but engage the cover near the center, and do not provide smooth operation and may bind. Other known powered truck bed tonneau covers are not easy to switch from manual to powered operation.

BRIEF SUMMARY OF THE INVENTION

The present invention addresses the above and other needs by providing a powered truck bed tonneau cover including a handle operating a clutch to engage and disengage an electric motor from the tonneau cover. The handle is operable whenever the tonneau cover is open. A Hall sensor measures the position of the cover and a user may select closed and open positions for powered operation. A canister and drive assembly of the powered truck bed tonneau cover resides just behind the cab and the drive assembly urges the cover into a spiral inside the canister to avoid binding.

In accordance with one aspect of the invention, there is provided a powered truck bed tonneau cover with a simple handle operated clutch to disengage a motor for manual operation.

In accordance with one aspect of the invention, there is provided a powered truck bed tonneau cover with a Hall sensor measuring cover position and a user may select fully open and fully closed positions for the cover.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 17 shows an interior view of the drive gear engaging the cover and a spiral cover guide according to the present invention.

FIG. 18 shows a second interior view of the drive gear engaging the cover and the spiral cover guide according to the present invention.

FIG. 19 shows an end piece of the cover according to the present invention.

FIG. 20 shows the end pieces attached to the cover according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 1:
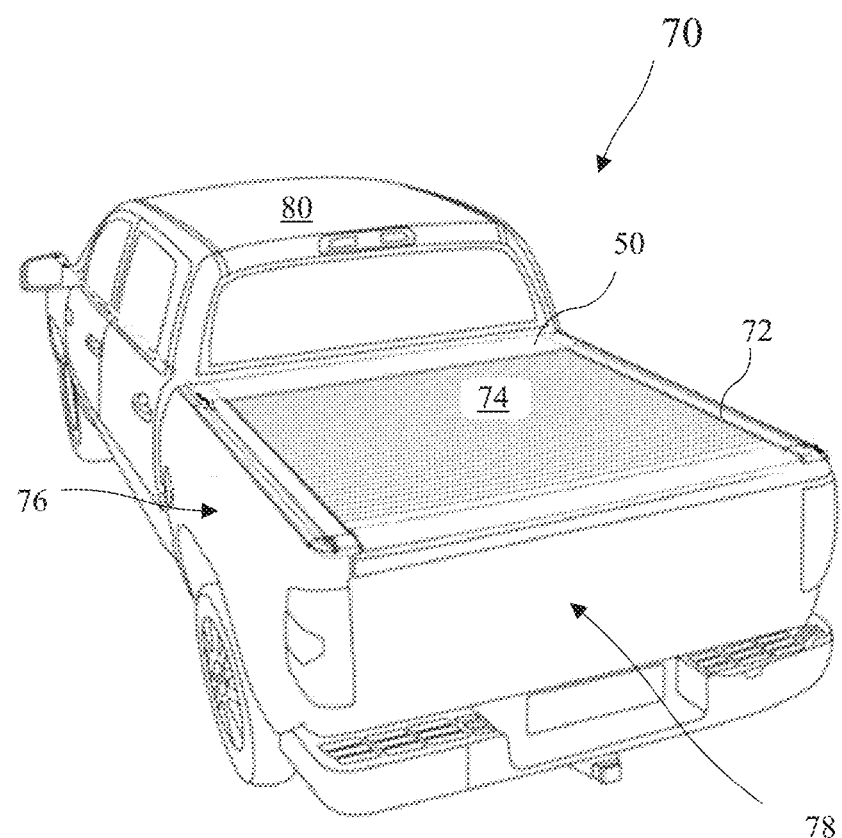
FIG. 1 shows a powered retractable tonneau cover according to the present invention on a truck.

A power retractable tonneau cover 74 according to the present invention is shown on a truck 70 in FIG. 1. The cover 74 rides on cover rails 72 attached to truck bed side walls 76 of a truck bed 78 behind a truck cab 80 to open and close. A canister 50 for storing an open cover 74 resides against a back surface of the cab 80.

Figure 2:
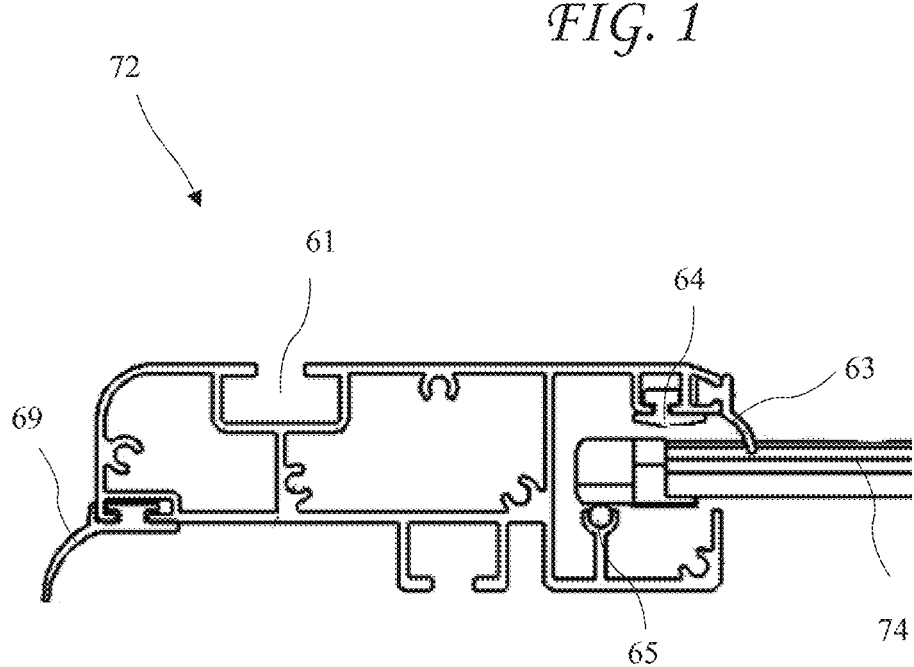
FIG. 2 shows a cross-sectional view of a cover rail of the powered retractable tonneau cover according to the present invention.

A cross-sectional view of the cover rail 72 of the power retractable tonneau cover is shown in FIG. 2. The rail 72 includes rubber strip 64 above an outside edge of the cover 74, an inner seal 63 and an outer seal 69 to block water entering the truck bed, and a steel rod 65 allowing the cover 74 to slide with less friction. An accessory channel 61 may be provided in the top of the cover rails 72.

Figure 3:
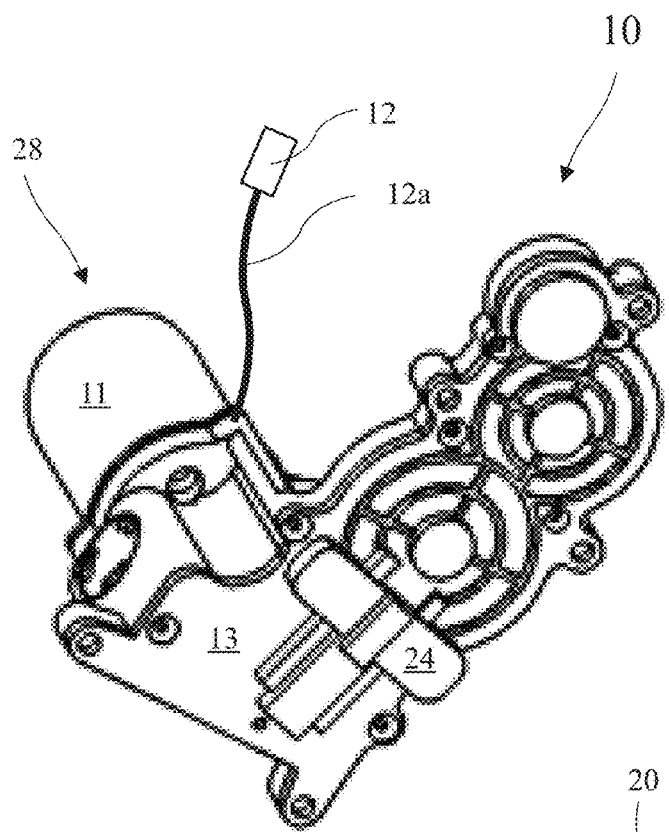
FIG. 3 shows a drive assembly for the powered retractable tonneau cover according to the present invention.
Figure 4:
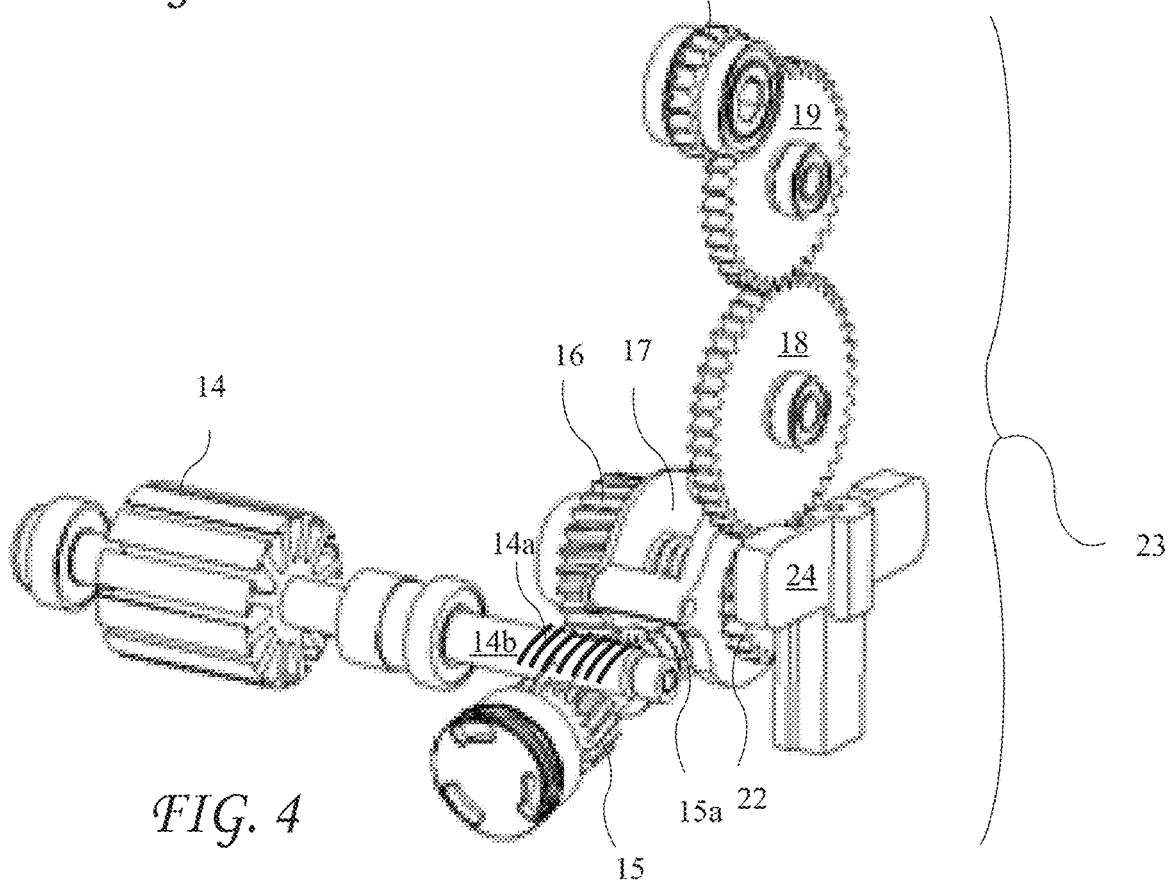
FIG. 4 shows a motor and gear set of the drive assembly for the powered retractable tonneau cover according to the present.

A drive assembly 10 including a motor 11, a housing 13, a control 12, control wiring 12a is shown in FIG. 3, and an exposed view of the drive assembly 10 including a gear set 23 is shown in FIG. 4. A motor armature 14 turns a first worm gear 14a on a motor shaft 14b. The worm gear 14a drives a first driven gear 15. A second worm gear 15a connected co-axially to the first driven gear 15 drives a second driven gear 16. The second driven gear 16 drives a first drive gear 22 through a clutch assembly 17. The first drive gear 22 drives a first intermediate gear 18. The first intermediate gear 18 drives a second intermediate gear 19. The second intermediate gear 19 drives a third driven gear 20. A cover gear 21 (see FIG. 17) is connected to the third driven gear 20. A handle 24 slides on the housing 13 exterior to engage and disengage the clutch assembly 17.

Figure 5:
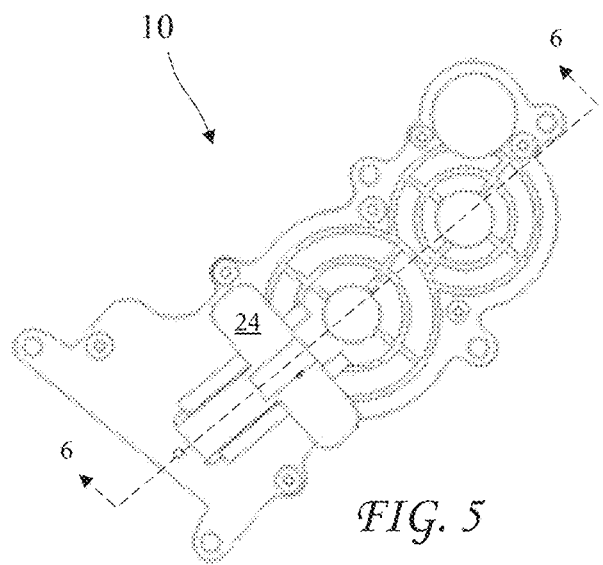
FIG. 5 shows the drive assembly for the powered retractable tonneau cover according to the present invention with a handle placing a clutch in an engaged position.
Figure 6:
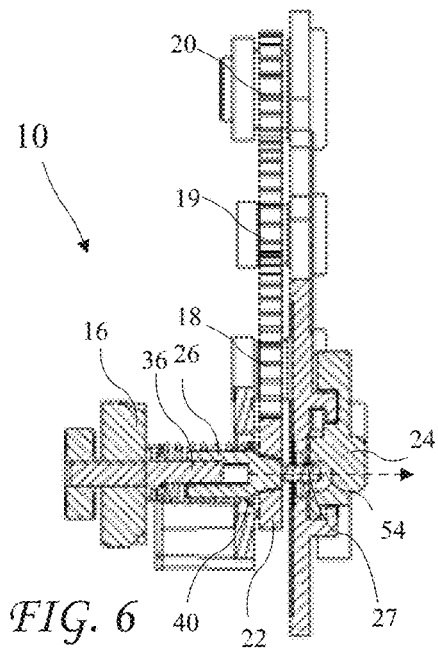
FIG. 6 shows a cross-sectional view taken along line 6-6 of FIG. 5 of the motor, clutch, and gear set of the drive assembly for the powered retractable tonneau cover according to the present invention with the handle placing the clutch in an engaged position.

The drive assembly 10 with the handle 24 placing the clutch assembly 17 in an engaged position is shown in FIG. 5 and a cross-sectional view taken along line 6-6 of FIG. 5 of the drive assembly 10 with the handle 24 placing the clutch assembly 17 in the disengaged position is shown in FIG. 6. The handle 24 includes a ramped slot 28 (see FIG. 9B) aligned with a nose 27 of a sliding clutch 26 (see FIG. 10) allowing the sliding clutch 26 to slide to the right and engage tapered engaging teeth 30 with a tapered engaging mouth 32 of the first drive gear 22, to engage the clutch assembly 17 (see FIGS. 10-13). A clutch spring 34 bears against a spring stop 40 urging the sliding clutch 26 to the right to engage the first drive gear 22. The sliding clutch 26 slides on a keyed shaft 36 to rotationally couple the sliding clutch 26 to the second driven gear 16. An example of a keyed shaft 36 is a hexagonal shaft. When the clutch assembly 17 is engaged, the motor 11 may open and close the cover 74.

Figure 7:
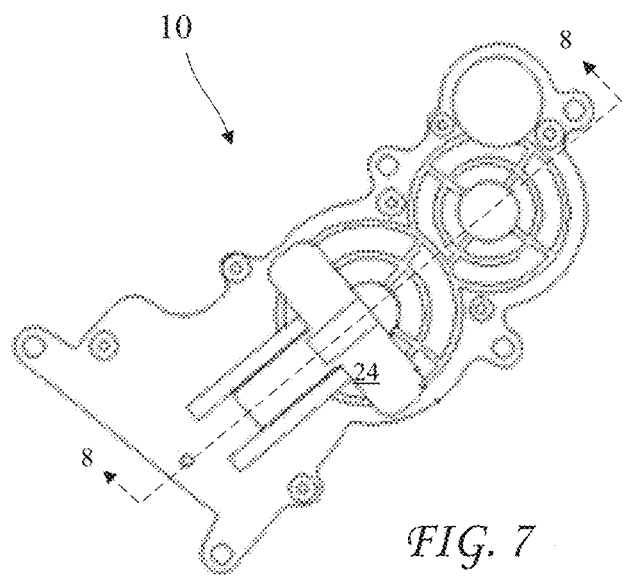
FIG. 7 shows the drive assembly for the powered retractable tonneau cover according to the present invention with the handle placing a clutch in a disengaged position.
Figure 8:
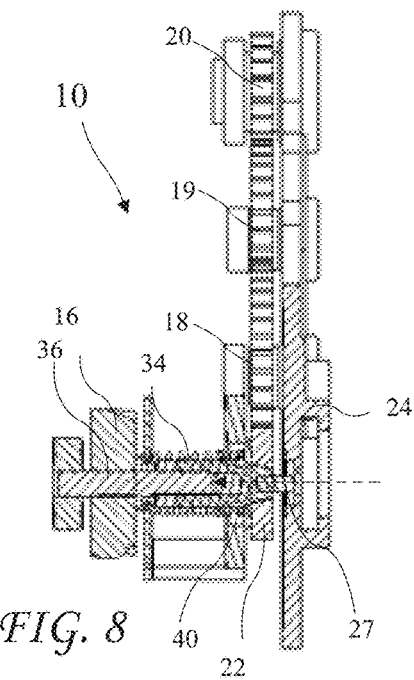
FIG. 8 shows a cross-sectional view taken along line 8-8 of FIG. 7 of the motor, the clutch, and the gear set of the drive assembly for the powered retractable tonneau cover according to the present invention with the handle placing the clutch in the disengaged position.

The drive assembly 10 with the handle 24 placing the clutch assembly 17 in a disengaged position is shown in FIG. 7 and a cross-sectional view taken along line 8-8 of FIG. 7 of the drive assembly 10 with the handle 24 placing the clutch assembly 17 in the disengaged position is shown in FIG. 8. The handle 24 bears against the nose 27 of the sliding clutch 26 and pushes the sliding clutch 26 to the left to disengage the tapered engaging teeth 30 from a tapered engaging mouth 32 of the first drive gear 22 (see FIGS. 10-13), disengaging the clutch assembly 17. When the clutch assembly 17 is disengaged, the motor 11 may not open and close the cover 74 and an operator may manually open and close the cover 74.

Figure 9A:
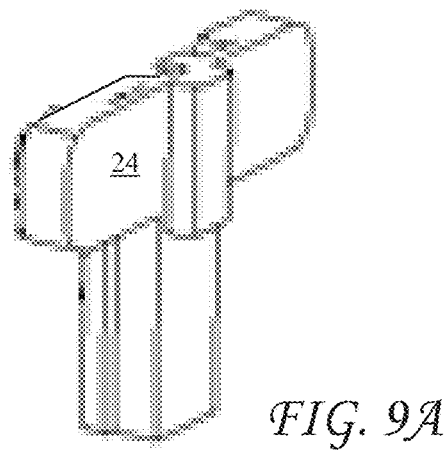
FIG. 9A shows a front view of the handle of the powered retractable tonneau cover according to the present.
Figure 9B:
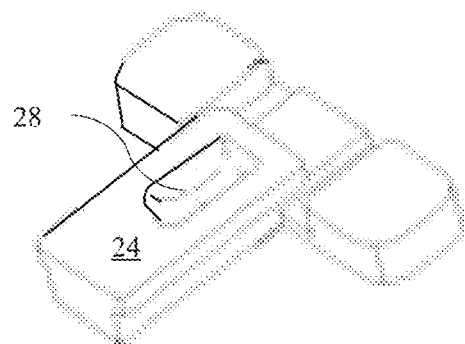
FIG. 9B shows a rear view of the handle of the powered retractable tonneau cover according to the present.

A front view of the handle 24 is shown in FIG. 9A and a rear view of the handle 24 is shown in FIG. 9B. The ramped slot 28 is formed on a rear surface of the handle 24.

Figure 10:
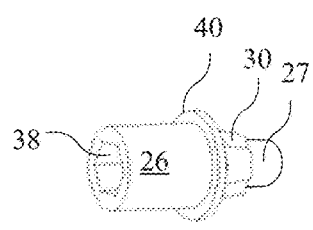
FIG. 10 shows a side and rear view of a sliding clutch of the powered retractable tonneau cover according to the present.
Figures 11, 12:
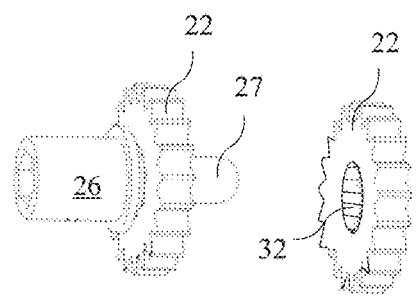
FIG. 11 shows a side and rear view of the sliding clutch engaging a first drive gear of the powered retractable tonneau cover according to the present.
FIG. 12 shows a side and rear view of the first drive gear according to the present.
Figure 13:
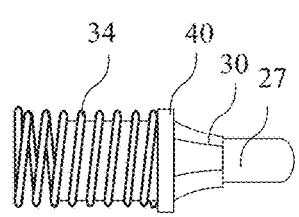
FIG. 13 shows a side view of the sliding clutch and clutch spring according to the present.

A side and rear view of a sliding clutch 26 is shown in FIG. 10, a side and rear view of the sliding clutch 26 engaging a first drive gear 22 is shown in FIG. 11, a side and rear view of the first drive gear 22 is shown in FIG. 12, and a side view of the sliding clutch 26 and clutch spring 34 is shown in FIG. 13. The sliding clutch 26 includes the tapered engaging teeth 30 which engage the tapered engaging mouth 32 of the first drive gear 22 to engage the clutch assembly 17. The clutch spring 34 biases the sliding clutch 26 to engage the first drive gear 22. The tapered engaging teeth 30 and tapered engaging mouth 32 may be any cooperating tapered shapes which engage to rotationally couple the sliding clutch 26 to the first drive gear 22.

Figure 14A:
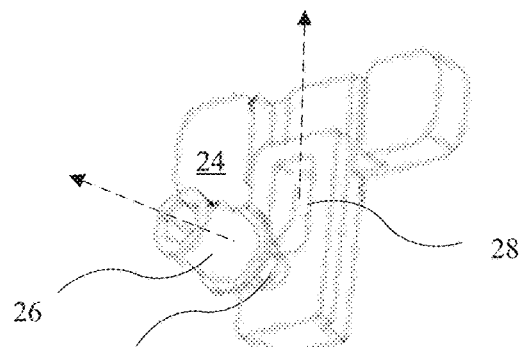
FIG. 14A shows the sliding clutch in a disengaged position by the handle of the powered retractable tonneau cover according to the present.
Figure 14B:
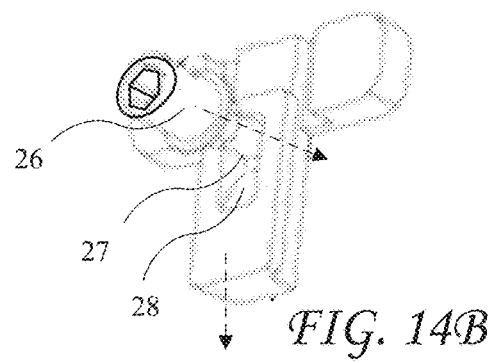
FIG. 14B shows the sliding clutch in an engaged position by the handle of the powered retractable tonneau cover according to the present.

The sliding clutch 26 disengaged (pushed to the left) by the handle 24 is shown in FIG. 14A, and the sliding clutch 26 engaged by the nose 27 sliding to the right into the ramped slot 27 of the handle 24 is shown in FIG. 14B. The clutch spring 34 driven by the cover gear 21 pushes the sliding clutch 26 to the right when the nose 27 aligns with the ramped slot 28.

Figure 15:
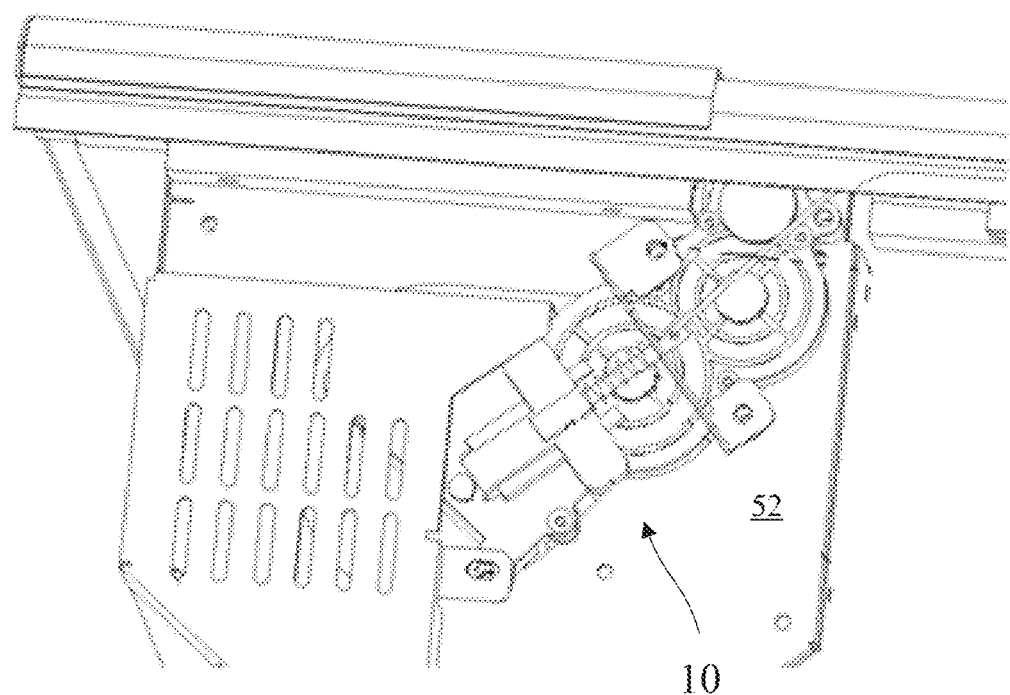
FIG. 15 shows the drive assembly attached to a canister of the powered retractable tonneau cover and engaging the cover according to the present invention.
Figure 16:
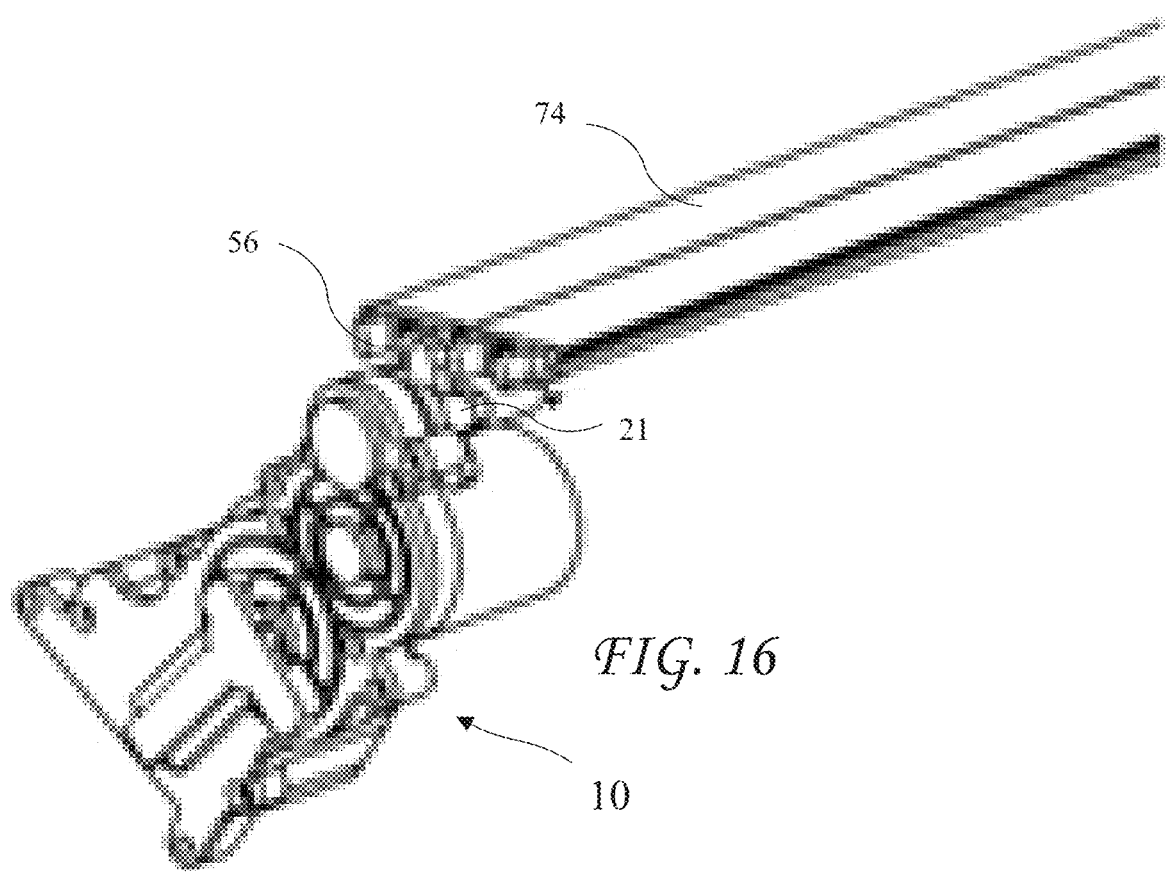
FIG. 16 shows the drive assembly engaging the cover according to the present invention.

The drive assembly 10 attached to a canister end 52 is shown in FIG. 15 and the drive assembly 10 engaging the cover 74 is shown in FIG. 16. A cover gear 21 of the drive assembly 10 engages end pieces 56 of the cover 74 to open and close the cover 74.

An interior view of the canister end 52 with the cover gear 21 engaging the end pieces 56 of the cover 74, and a spiral cover guide 54 guiding the cover 74 into the canister 50 (see FIG. 21), are shown in FIG. 17, and a second interior view of the canister end 52 and the spiral cover guide 54 is shown in FIG. 18.

The end piece 56 of the cover 74 are shown in FIG. 19 and the end pieces 56 attached to a side 74a of the cover 74 are shown in FIG. 20.

Figure 21:
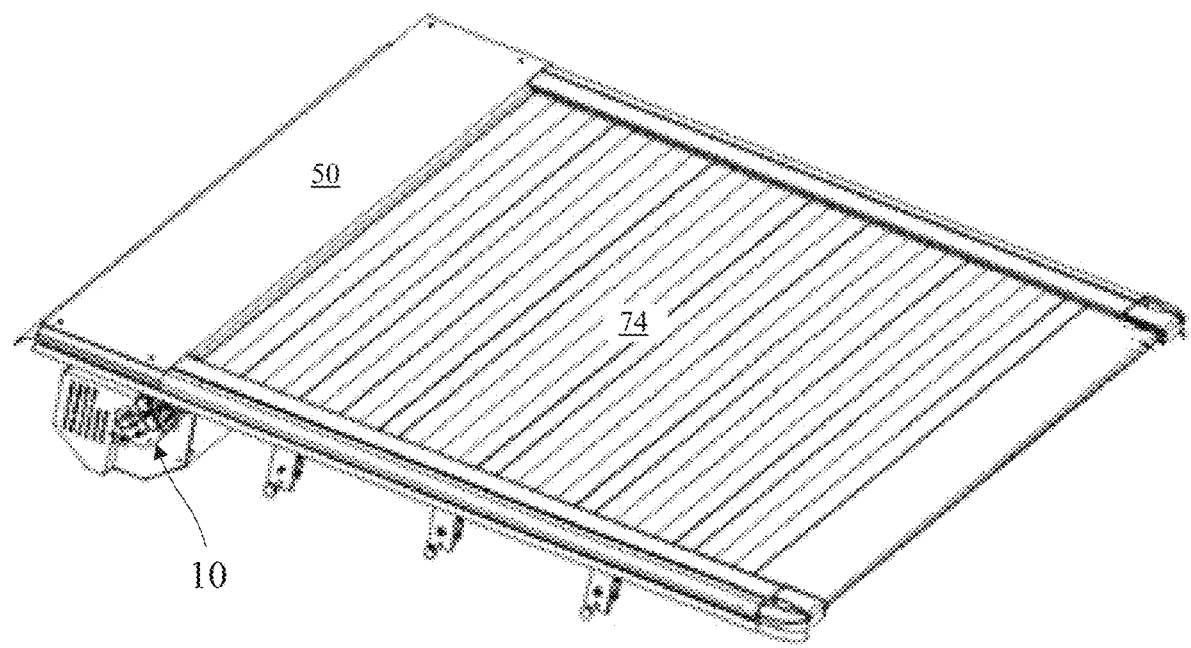
FIG. 21 shows the cover, canister, and dive assembly according to the present invention.

The cover 74, canister 50, and dive assembly 10 are shown together in FIG. 21.

While the invention herein disclosed has been described by means of specific embodiments and applications thereof, numerous modifications and variations could be made thereto by those skilled in the art without departing from the scope of the invention set forth in the claims.

I claim:

1. A powered truck bed tonneau cover, comprising:
   cover rails configured to attach to truck bed side walls;
   a cover forwardly and rearwardly slidable on the cover rails;
   a drive assembly comprising:
      an electric motor;
      a first worm gear rotationally coupled to the motor;
      the first worm gear driving a first driven gear;
      a second worm gear rotationally coupled to the first driven gear;
      the second worm gear driving a second driven gear;
      a clutch assembly rotationally coupled to the second driven rear;
      a first drive gear rotationally coupled to the second driven gear when the clutch is engaged;
      a first intermediate gear driven by the first drive gear;
      a second intermediate gear driven by the first intermediate grear;
      a third driven gear driven by the second intermediate gear; and
      the cover gear being rotationally couple to the third driven gear;
      a handle having a first position disengaging the clutch assembly for manual opening and closing the cover and a second position engaging the clutch assembly for powered opening and closing the cover; and
   end pieces residing along a side of the cover, the cover gear engaging the end pieces to slide the cover on the cover rails.

2. The powered truck bed tonneau cover of claim 1, wherein:
   the clutch assembly includes a sliding clutch biased to an engaged position;
   the handle cooperates with the sliding clutch to disengage the clutch assembly.

3. The powered truck bed tonneau cover of claim 2, wherein:
   the sliding clutch includes a nose residing against the handle;

the handle includes a ramped slot alignable with the nose to engage the clutch assembly and miss-alignable with the nose to disengage the clutch assembly.

4. The powered truck bed tonneau cover of claim 3, wherein a clutch spring biases the sliding clutch into the ramped slot to engage the clutch assembly.

5. The powered truck bed tonneau cover of claim 4, wherein the sliding clutch slides on a keyed shaft rotationally coupling the sliding clutch to the motor.

6. The powered truck bed tonneau cover of claim 1, wherein:
the first worm gear is coaxial with a motor shaft of the motor;
the second worm gear is coaxial with the first driven gear.

7. The powered truck bed tonneau cover of claim 1, wherein the cover gear is coaxial with the third driven gear.

8. The powered truck bed tonneau cover of claim 1, further including a canister residing at a forward end of a truck bed, the cover is stored in the canister when open.

9. The powered truck bed tonneau cover of claim 8, wherein the canister includes spirals in canister ends to guide the cover during opening.

10. A powered truck bed tonneau cover, comprising:
cover rails configured to attach to side walls of a truck bed;
a cover forwardly and rearwardly slidable on the cover rails;
a drive assembly comprising:
an electric motor;
a cover gear engaging the cover to open and close the cover;
a first worm gear rotationally coupled to the motor;
the first worm gear driving a first driven gear;
a second worm gear rotationally couple to the first driven gear;
the second worm gear driving a second driven gear;
a clutch assembly rotationally coupled to the second driven gear, the clutch assembly comprising:
a keyed shaft rotationally coupled to the second driven gear motor;
a sliding clutch slidable on the keyed shaft and rotationally keyed to the keyed shaft;
a nose on a first end of the sliding clutch;
a ramped slot on a surface of a handle facing the nose of the sliding clutch, the handle moveable to align the ramped slot with the nose of the sliding clutch and moveable to miss-align the ramped slot with the nose of the sliding clutch;
the nose of the sliding clutch biased into the ramped slot and the sliding clutch sliding towards the handle when the nose is aligned with the ramped slot, to rotationally couple the second driven gear to the cover gear; and
the nose of the sliding clutch pushed out of the ramped slot and the sliding clutch sliding away from the handle when the nose is not aligned with the ramped slot to rotationally de-couple the second driven gear from the cover gear; and
end pieces residing along a side of the cover, the cover gear engaging the end pieces to slide the cover on the cover rails.

11. A powered truck bed tonneau cover, comprising:
cover rails configured to attach to side walls of a truck bed;
a cover forwardly and rearwardly slidable on the cover rails;
a drive assembly comprising:
an electric motor;
a cover gear engaging the cover to open and close the cover;
a first worm gear rotationally coupled to the motor;
the first worm gear driving a first driven gear;
a second worm gear rotationally coupled to the first driven gear;
the second worm gear driving a second driven gear;
a clutch assembly rotationally coupled to the second driven gear;
a first drive gear rotationally coupled to the second driven gear through the clutch;
a first intermediate gear driven by the first drive gear;
a second intermediate gear driven by the first intermediate gear;
a third driven gear driven by the second intermediate gear; and
the cover gear rotationally coupled to the third driven gear;
the clutch assembly comprising:
a keyed shaft rotationally coupled to the second driven gear;
a sliding clutch sliding on the keyed shaft and rotationally coupled to the keyed shaft;
a nose on a first end of the sliding clutch opposite to the second driven gear;
a ramped slot on a surface of a handle facing the nose of the sliding clutch, the handle moveable to align the ramped slot with the nose of the sliding clutch and moveable to miss-align the ramped slot with the nose of the sliding clutch;
the nose of the sliding clutch biased into the ramped slot and the sliding clutch sliding towards the handle when the nose is aligned with the ramped slot, to rotationally couple the second driven gear to the first drive gear; and
the nose of the sliding clutch pushed out of the ramped slot and the sliding clutch sliding away from the handle when the nose is not aligned with the ramped slot to rotationally de-couple the second driven gear to the first drive gear; and
end pieces residing along a side of the cover, the cover gear engaging the end pieces to slide the cover on the cover rails.

* * * * *